US00RE41634E

(19) United States
(12) Reissued Patent
Kuo

(10) Patent Number: US RE41,634 E
(45) Date of Reissued Patent: Sep. 7, 2010

(54) CONCAVE MIRROR OPTICAL SYSTEM FOR SCANNER

(76) Inventor: Shih-Zheng Kuo, No. 1., Alley 8, Lanes 57, Yusi Street, Yonghe City, Taipei County (TW)

(21) Appl. No.: 11/283,480

(22) Filed: Nov. 18, 2005

Related U.S. Patent Documents

Reissue of:
(64) Patent No.: 6,648,483
Issued: Nov. 18, 2003
Appl. No.: 09/611,755
Filed: Jul. 7, 2000

(51) Int. Cl.
*G02B 26/08* (2006.01)
*G02B 26/10* (2006.01)
*G02B 26/12* (2006.01)

(52) U.S. Cl. ..... 359/208.1; 359/857; 359/858; 359/859; 359/861

(58) Field of Classification Search ..... 359/208, 359/399, 857, 858, 859, 861, 365, 208.1
See application file for complete search history.

(56) References Cited

U.S. PATENT DOCUMENTS

| | | | | | |
|---|---|---|---|---|---|
| 4,240,707 | A | * | 12/1980 | Wetherell et al. | 359/859 |
| 4,357,075 | A | * | 11/1982 | Hunter | 359/858 |
| 4,572,659 | A | | 2/1986 | Omata | |
| 4,834,517 | A | * | 5/1989 | Cook | 359/366 |
| 5,071,240 | A | | 12/1991 | Ichihara et al. | |
| 5,815,310 | A | | 9/1998 | Williamson | |
| 5,999,311 | A | * | 12/1999 | Nanba et al. | 359/365 |
| 6,231,199 | B1 | | 5/2001 | Li | |
| 6,333,811 | B1 | * | 12/2001 | Tatian et al. | 359/366 |
| 6,426,506 | B1 | | 7/2002 | Hudyma | |
| 6,577,443 | B2 | | 6/2003 | Dinger et al. | |
| 6,850,361 | B1 | * | 2/2005 | Nakano et al. | 359/365 |

* cited by examiner

*Primary Examiner*—Alessandro Amari
(74) *Attorney, Agent, or Firm*—Stolowitz Ford Cowger LLP

(57) ABSTRACT

A concave mirror optical system for a scanner and a method for compensating image distortion. In this invention, the more expensive lens assembly in a conventional optical system is replaced by a concave mirror made from simple low-cost material so that production cost and chromatic dispersion are reduced. Moreover, different magnifications can be obtained due to a difference in focusing power of the concave mirror along XY axis direction.

24 Claims, 6 Drawing Sheets

CONCAVE MIRROR OPTICAL SYSTEM FOR SCANNER

Matter enclosed in heavy brackets [ ] appears in the original patent but forms no part of this reissue specification; matter printed in italics indicates the additions made by reissue.

BACKGROUND OF THE INVENTION

1. Field of Invention

The present invention relates to an optical system for a scanner. More particularly, the present invention relates to a concave mirror optical system for a scanner.

2. Description of Related Art

Rapid progress in multi-media technologies has lead to great advances in image-processing devices. In a few years time, the black-and-white palm-top scanners has developed into full-color high-resolution scanner system that can display fine detail with added realism.

In general, scanning systems can be roughly divided into the reflective type and the transparent type. In the reflective scanning system, a document (made of non-transparent material) is placed on a transparent glass panel. Light transmitting through the transparent glass panel impinges upon the document. The light is reflected by the document into an optical system before delivering to an optical sensor such as a charge couple device (CCD) or a contact image sensor (CIS) to form a scan image. In the transparent scanning system, a document (made of transparent material such as a film negative or projector slide) is also placed on a transparent glass panel. However, light form a light source penetrates the document after passing through the transparent glass panel to form a scan image at the optical sensor.

FIG. 1 is a schematic cross-sectional view showing a conventional scanning system. To scan a non-transparent document 40 on a transparent glass panel 20, the reflective scanning system is activated. A light source 38 on a sense carrier 30 aims a beam of light at the transparent glass panel 20. The beam of light is reflected back by the document 40 and is channeled through a slit 34 into the sense carrier 30. An optical system 36 (details not shown) inside the sense carrier 30 picks up the reflected light and transmits the light to an optical sensor 32 (a CCD or a CIS). Inside the optical sensor 32, data encoded in the light beam is transformed into image data. Hence, an image line is scanned. As the sense carrier 30 moves forward along the transparent glass panel 20, different swath of image comes into view. Each swath is captured by sequentially until image data of the entire document is captured. When the scanning system operates in the reflective mode, a light source carrier 10 above the glass panel 20 is stationary.

To scan a transparent document 40, the transparent scanning system is activated. A light source 12 inside the light source carrier 10 produces a beam of light through a slit 14 and aims at the document 40 on the transparent panel 20. After passing through the document 40, the beam of light is channel through the slit 34 into the optical system 36 (detail not shown) of the sense carrier 30. The light passes from the optical system 36 into the optical sensor 32 where data encoded in the light beam is converted to a line of image data. Hence, an image line is scanned. As the light source carrier 10, and the sense carrier 30 moves forward along the transparent glass panel 20, different swath of image comes into view. Each swath is captured sequentially until image data of the entire document is captured. When the scanning system operates in the transparent mode, the light source 38 on the sense carrier 30 does not emit any light.

FIG. 2 is a sketch of the optical system inside a conventional scanner. As shown in FIG. 2, the purpose of an optical system 136 is to capture light image produced by the document 40 and relay the light image to the optical sensor 132. The optical system 136 includes at least a reflecting mirror 137 and a lens assembly 138. The reflecting mirror 137 is used to change light travel direction while the lens assembly 138 is used for focusing the light onto the optical sensor 132.

In a conventional scanner, a reflecting mirror 137 and a lens assembly 138 are generally used inside the optical system 136. Hence, the optical system is structurally complicated and difficult to assembly, thereby increasing the production cost. Moreover, the lens assembly 138 may produce chromatic dispersion that may affect the image quality.

SUMMARY OF THE INVENTION

Accordingly, one object of the present invention is to provide a concave mirror in the optical system of a scanner such that the concave mirror replaces the lens assembly in the conventional optical system.

A second object of this invention is to provide a concave mirror in the optical system of a scanner such that chromatic dispersion by the lens assembly of a conventional scanner is eliminated. In addition, simple material is used to form the concave mirror so that production cost is greatly reduced. Moreover, different magnifications can be obtained due to a difference in focusing power of the concave mirror along XY axis direction.

To achieve these and other advantages and in accordance with the purpose of the invention, as embodied and broadly described herein, the invention provides a concave mirror optical system for a scanner. Light is beamed to the first surface of a first concave mirror. The light is reflected from the first concave mirror to the first surface of a second concave mirror. The light is reflected again from the second concave mirror to the first surface of a second concave mirror. Light reflected from the second concave mirror is focused to a focus point. The receiving end of an optical sensor is positioned at the focus point so that the batch of light reflected from the second concave mirror is received.

This invention also provides a method of compensating the distorted image produced by a scanner. First, an image to be calibrated is provided. The difference in distance between a pixel on the image and a pixel on the actual image is computed. The values for calibrating pixel differences are stored. According to the stored pixel differences, the pixels in a distorted image are calibrated and the resulting image data after pixel correction are placed in memory.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
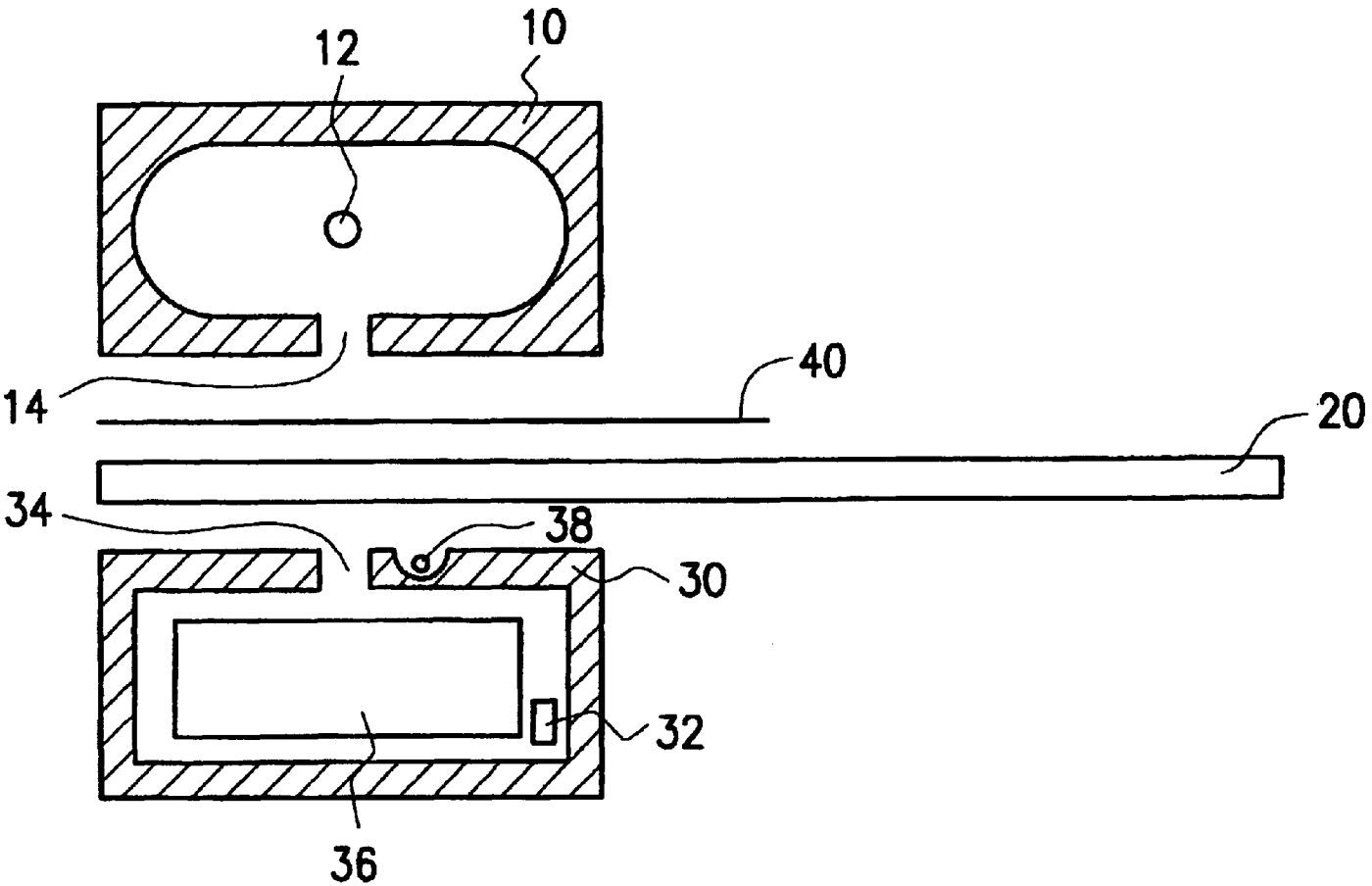
FIG. 1 (PRIOR ART)
FIG. 1 is a schematic cross-sectional view showing a conventional scanning system.
Figure 2:
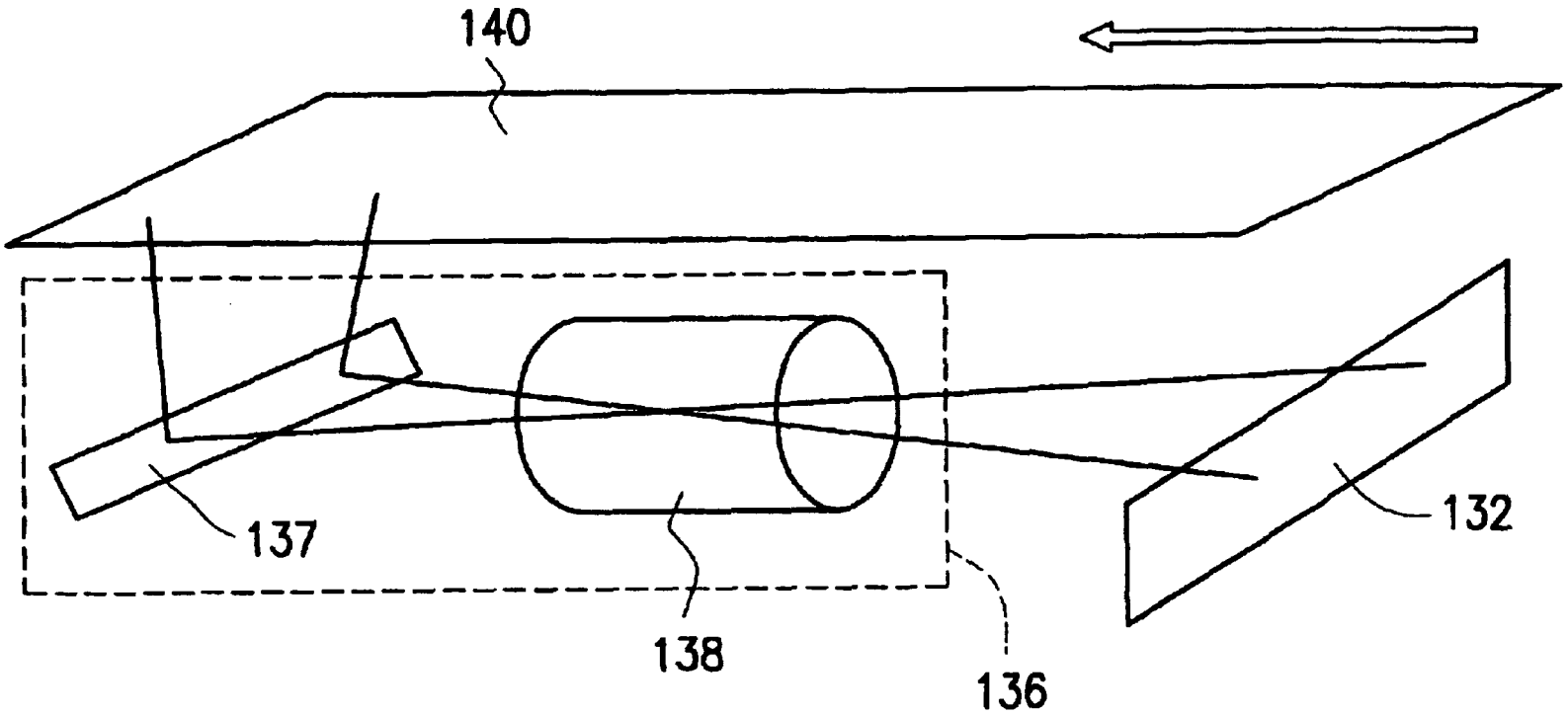
FIG. 2 (PRIOR ART)
FIG. 2 is a sketch of the optical system inside a conventional scanner.

Reference will now be made in detail to the present preferred embodiments of the invention, examples of which are illustrated in the accompanying drawings. Wherever possible, the same reference numbers are used in the drawings and the description to refer to the same or like parts.

Figure 3A:
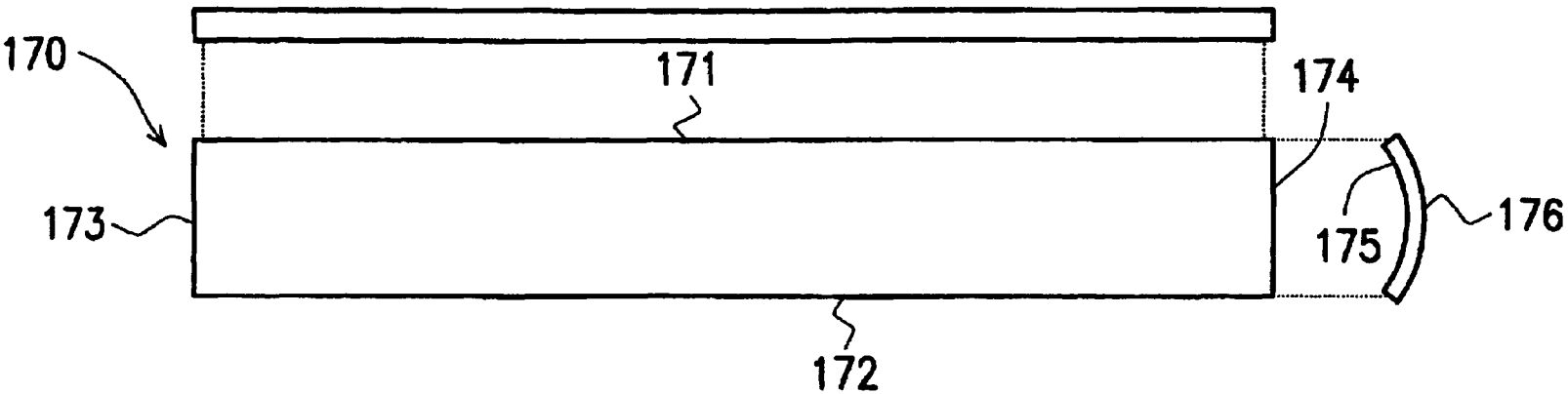
FIG. 3A is the top view and the side view of a first concave mirror to be used in the optical system of this invention.

FIG. 3A is the top view and the side view of a first concave mirror to be used in the optical system of this invention. As shown in FIG. 3A, the first concave mirror 170 has a cylindrical or straight barrel-shaped surface. The list concave mirror 170 has a first long edge 171, a second long edge 172, a first short edge 173, a second short edge 174, a first surface 175 and a second surface 176. The first short edge 173 and the second short edge 174 curve to form the concave first surface 175 and the convex second surface 176.

Figure 3B:
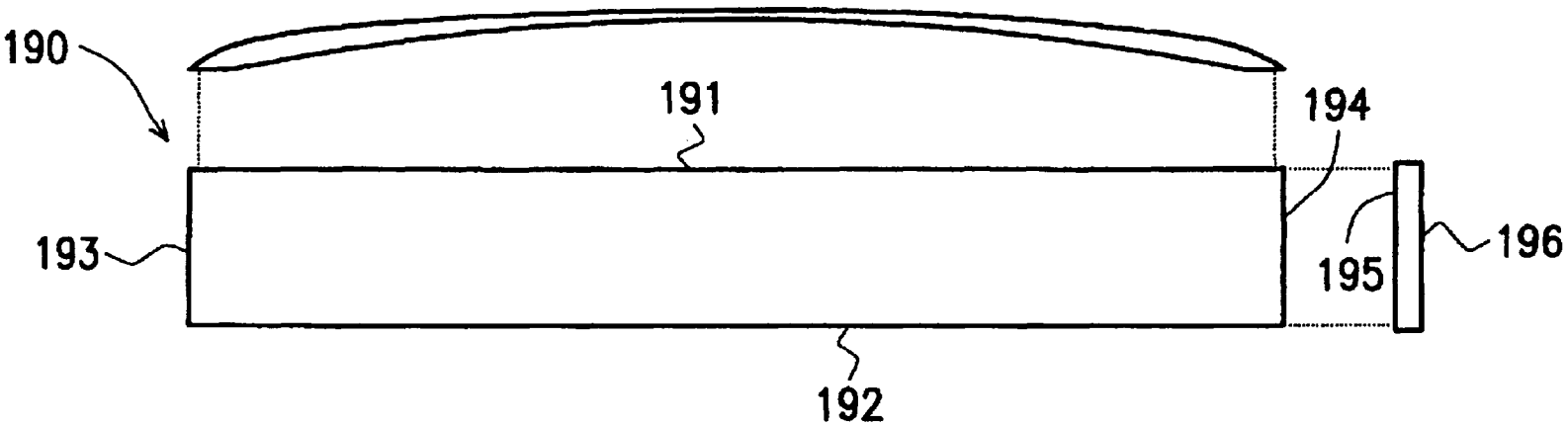
FIG. 3B is the top view and the side view of a second concave mirror to be used in the optical system of this invention.

FIG. 3B is the top view and the side view of a second concave mirror to be used in the optical system of this invention. As shown in FIG. 3B, the second concave mirror 190 has a cylindrical or straight barrel-shaped surface. The second concave mirror 190 has a first long edge 191, a second long edge 192, a first short edge 193, a second short edge 194, a first surface 195 and a second surface 196. The first long edge 191 and the second long edge 192 curve to form the concave first surface 195 and the convex second surface 196.

Figure 4:
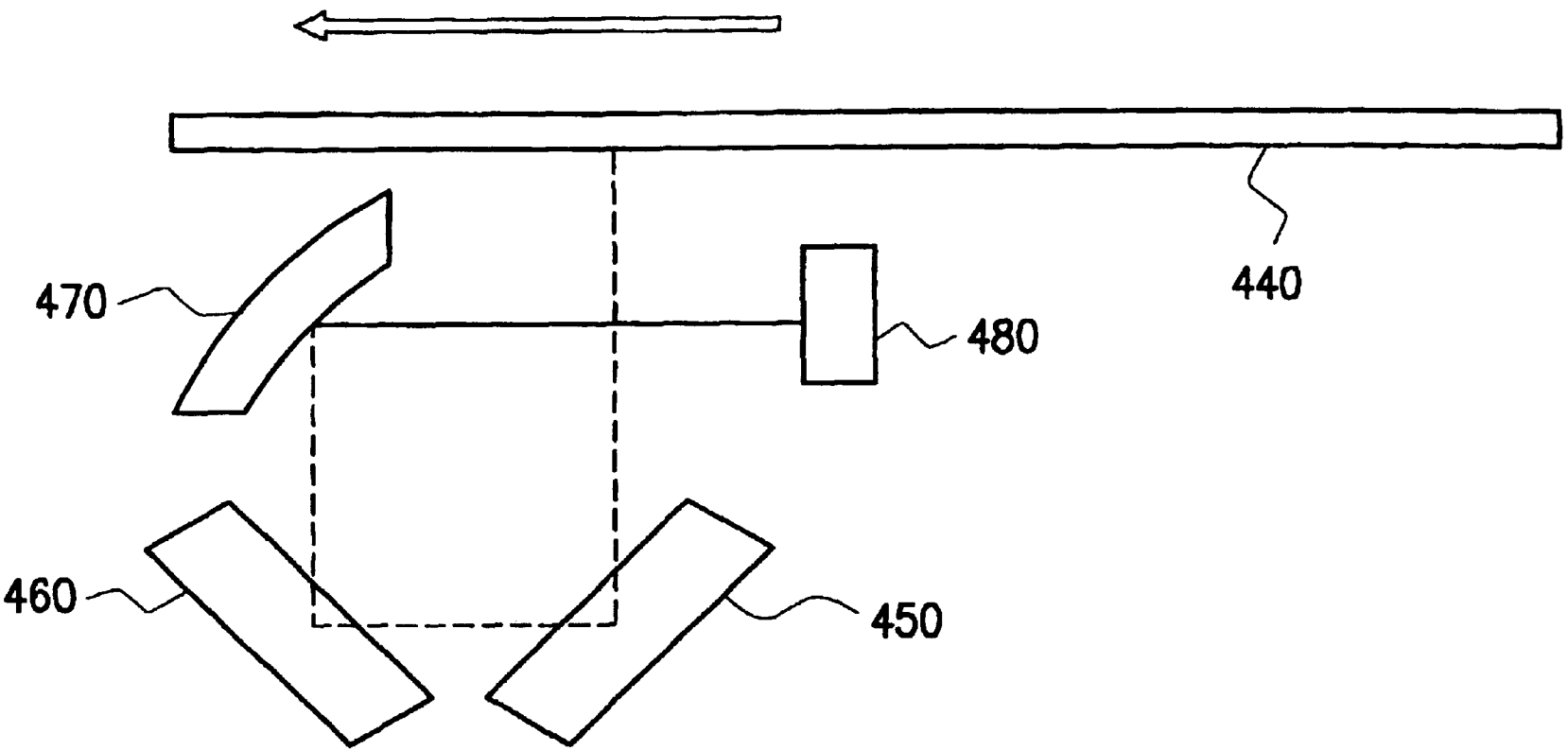
FIG. 4 is the concave mirror optical system of a scanner according to a preferred embodiment of this invention.

FIG. 4 is the concave mirror optical system of a scanner according to a preferred embodiment of this invention. The optical system in this embodiment uses two similar concave mirror of the type shown in FIG. 3B and a concave mirror of the type shown in FIG. 3A. When light shines on a document 440, image-encoded light is transmitted to the first surface of a first concave mirror 450 and then reflected to the first surface of a second concave mirror 460. The reflected from the second concave mirror 460 is transmitted to the first surface of a [second] *third* concave mirror 470. Since the first concave mirror 450 and the second concave mirror 460 are of the same type, light from the first concave mirror surface is coupled to the second concave mirror surface without optical losses. The [second] *third* concave mirror 470 functions as a conventional reflecting mirror changing the direction of light travel. Moreover, the [second] *third* concave mirror 470 is capable of bringing an incoming light beam to a focus. The receiving end of an optical sensor [470] *480* is positioned at the focus of the [second] *third* concave mirror 470. Hence, the optical sensor [370] *480* is able to collect light from the [second] *third* concave mirror 470 to form a scan image.

The concave mirror optical system in this invention is also capable of compensating for image distortion so that defective image resulting from poor optical system design can be rectified.

Figure 5:
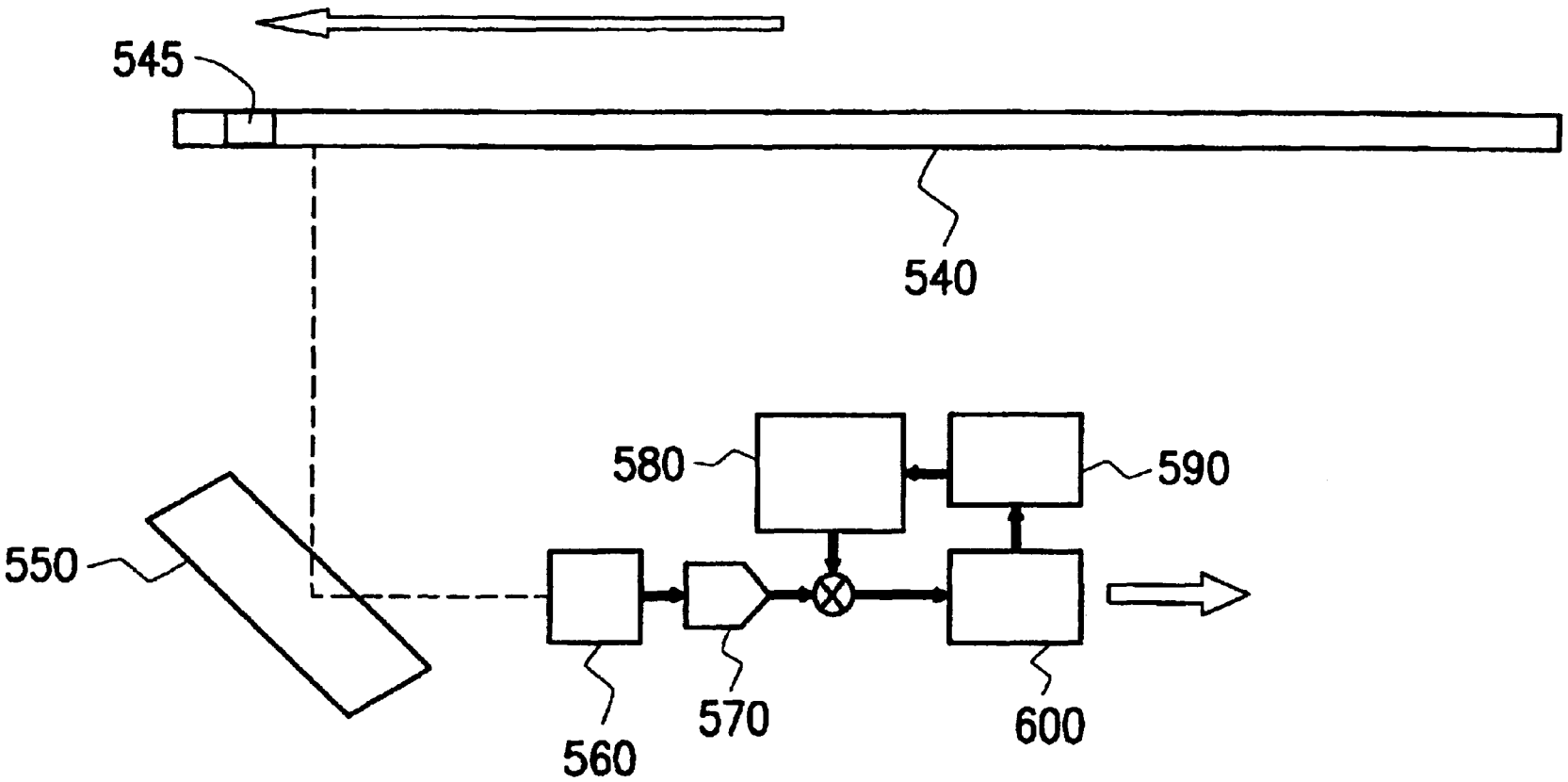
FIG. 5 is a schematic diagram showing the scheme used for compensating image distortion in an optical scanning system according to this invention.

FIG. 5 is a schematic diagram showing the scheme used for compensating image distortion in an optical scanning system according to this invention. The image distortion compensating system includes a concave mirror 550 of the type shown in FIG. 3B, an optical sensor [570] *560*. Since only one concave mirror 550 is used, the image-encoded light from the document 540 that impinges on the optical sensor 560 is U-shaped rather than linear. Hence, the image emerging from the optical system is distorted. To reproduce the original image, the distorted image must be compensated.

First, before the scanning is conducted, image 545 to be calibrated is converted to digital data via an analogue-to-digital converter 570. The digital data is stored in a RAM unit 600. A CPU 590 picks up the data from the RAM unit and computes the correct position of each pixel on the image 545. Data for correcting the positions of various pixels are stored in an image-correction unit 580. When scanning starts, the scanned image can combine with the data in the image-correction unit 580 to form a calibrated image. Hence, data emerging from the memory unit 600 is free from any distortion.

Figure 6:
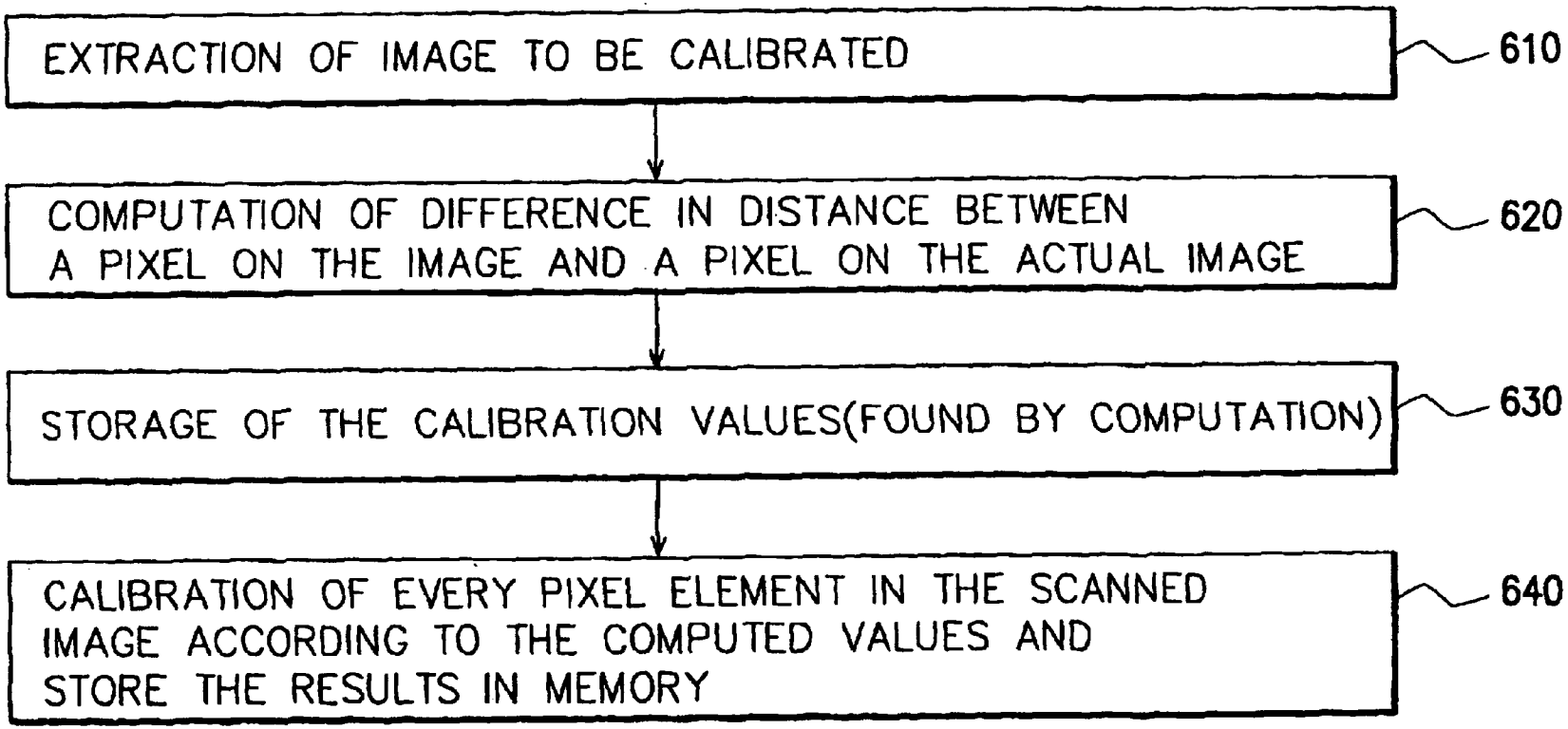
FIG. 6 is a flow chart listing the steps for compensating image distortion according to this invention.

FIG. 6 is a flow chart listing the steps for compensating image distortion according to this invention. In the first step 610 the image to be calibrated is extracted. In the second step 620, difference in distance between a pixel on the image and a pixel on a corrected image is computed. In step 630, the values found by the computation are stored in memory. Finally, in step 640, every pixel element in the scanned image is calibrated using the values stored in memory to reproduce a distortion-free image.

In summary, this invention provides a scanning system having a concave mirror. The advantages of replacing the more expensive lens assembly in a conventional optical system by concave mirror made from simple low-cost material include the reduction of cost and the elimination of chromatic dispersion. Moreover, different magnifications can be obtained due to a difference in focusing power of the concave mirror along XY axis direction.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. [A concave mirror] *An* optical system [for a scanner], comprising:

a first concave mirror having a [first] *concave* surface [for receiving] *configured to reflect* a beam of incoming light *received directly from a document*;

a second concave mirror having a [first] *concave* surface [for receiving] *configured to reflect* the [reflected] light *reflected* from the first concave mirror;

a third concave mirror having a [first] *concave* surface [for receiving] *configured to receive* the reflected light from the second concave mirror and [focusing] *to focus* the reflected light to a focal point*, wherein the first concave mirror, the second concave mirror, and the third concave mirror each include short edges and long edges, wherein the short edges of the first concave mirror and the second concave mirror curve to form corresponding concave surfaces of the first concave mirror and the second concave mirror, and wherein the long edges of the third concave mirror curve to form the concave surface of the third concave mirror*; and an optical sensor [whose receiving end is] positioned at the focal point [for receiving] *to receive the reflected* light [reflected] from the third concave mirror.

2. The optical system of claim 1, wherein the first concave mirror and the second concave mirror are *substantially* identical.

3. The optical system of claim 1, wherein the first *concave mirror* and the second concave mirror [includes a first long edge, a second long edge,] *each include* a first short edge[.] *and* a second short edge, [a first surface and a second surface, and] *wherein* the first short edge and the second short edge [are curves forming] *curve to form* a concave [first] surface and a convex [second] surface.

4. The optical system of claim 1, wherein the [second] *third* concave mirror includes a first long edge[,] *and* a second long edge, [a first short edge, a second short edge, a first surface and a second surface, and] *wherein* the first [short] *long* edge and the second [short] *long* edge [are curves forming] *curve to form the* a concave [first] surface and a convex [second] surface.

5. The optical system of claim 1, wherein the optical sensor includes a charge couple device (CCD).

6. The optical system of claim 1, wherein the optical sensor includes a contact image sensor (CIS).

*7. An apparatus, comprising:*

*a mirror assembly configured to reflect light received from a document, wherein the mirror assembly includes a plurality of mirrors having concave surfaces, wherein the mirrors directly reflect the received light between the concave surfaces, wherein each of the mirrors includes short edges and long edges, and wherein the short edges curve to form the concave surface for at least one of the mirrors and the long edges curve to form the concave surface for at least another one of the mirrors; and*

*an optical sensor positioned at a focal point and configured to receive light reflected from the mirror assembly.*

*8. The apparatus of claim 7, wherein the mirror assembly comprises a first concave mirror having a concave surface to reflect the received light to a concave surface of a second concave mirror, wherein the first concave mirror is configured to receive the light directly from the document.*

*9. The apparatus of claim 8, wherein the mirror assembly further comprises a third concave mirror having a concave surface to focus light reflected from the concave surface of the second concave mirror.*

*10. The apparatus of claim 9, wherein the third concave mirror comprises a first long edge and a second long edge, and wherein the first long edge and the second long edge curve to form the concave surface of the third concave mirror.*

*11. The apparatus of claim 8, wherein the first concave mirror and the second concave mirror each include a first short edge and a second short edge, and wherein the first short edge and the second short edge curve to form the corresponding concave surfaces.*

*12. The apparatus of claim 8, wherein the first concave mirror and the second concave mirror are substantially the same.*

*13. The apparatus of claim 7, wherein the optical sensor comprises a charge couple device (CCD).*

*14. The apparatus of claim 7, wherein the optical sensor comprises a contact image sensor (CIS).*

*15. A system, comprising:*

*a first mirror comprising a concave surface configured to, at least in part, reflect incident light;*

*a second mirror comprising a concave surface configured to, at least in part, reflect incident light received from the first mirror; and*

*a third mirror comprising a concave surface configured to, at least in part, reflect incident light received from the second mirror and, at least in part, focus the received reflected light on an optical sensor, wherein the first mirror, the second mirror, and the third mirror each include short edges and long edges, wherein the short edges of the first mirror and the second mirror curve to form corresponding concave surfaces, and wherein the long edges of the third mirror curve to form the concave surface of the third mirror.*

*16. The system of claim 15, wherein the first mirror and the second mirror are substantially the same.*

*17. The system of claim 15, wherein the first mirror and the second mirror each include a first short edge and a second short edge, and wherein the first short edge and the second short edge curve to form the respective concave surfaces.*

*18. The system of claim 15, wherein the third mirror comprises a first long edge and a second long edge, and wherein the first long edge and the second long edge curve to form the concave surface of the third mirror.*

*19. A method, comprising:*

*reflecting light received directly from a document with a first concave surface, wherein the first concave surface includes one or more short edges and one or more long edges, and wherein the one or more short edges curve to form the first concave surface;*

*reflecting light received from and reflected by the first concave surface with a second concave surface, wherein the second concave surface includes one or more short edges and one or more long edges, and wherein the one or more short edges curve to form the second concave surface;*

*focusing the light received from and reflected by the second concave surface with a third concave surface, wherein the third concave surface includes one or more short edges and one or more long edges, and wherein the one or more long edges curve to form the third concave surface; and*

*sensing the light focused by the third concave surface.*

*20. The method of claim 19, wherein said sensing is performed at a focus of the light from the third concave surface.*

*21. The method of claim 19, wherein said sensing is performed by a charge couple device (CCD).*

*22. The method of claim 19, wherein said sensing is performed by a contact image sensor (CIS).*

*23. A system, comprising:*

*means for reflecting light received from a document with a first concave surface, wherein the first concave surface includes one or more short edges and one or more long edges, and wherein the one or more short edges curve to form the first concave surface;*

*means for reflecting light received from and reflected by the first concave surface with a second concave surface, wherein the second concave surface includes one or more short edges and one or more long edges, and wherein the one or more short edges curve to form the second concave surface;*

*means for focusing the light received from and reflected by the second concave surface with a third concave surface, wherein the third concave surface includes one or more short edges and one or more long edges, and wherein the one or more long edges curve to form the third concave surface; and*

*means for sensing the light focused from the third concave surface.*

*24. The system of claim 23, wherein the means for reflecting light with a first concave surface and the means for reflecting the light with a second concave surface are substantially identical.*

* * * * *

UNITED STATES PATENT AND TRADEMARK OFFICE

CERTIFICATE OF CORRECTION

PATENT NO. : RE41,634 E
APPLICATION NO. : 11/283480
DATED : September 7, 2010
INVENTOR(S) : Shih-Zheng Kuo It is certified that error appears in the above-identified patent and that said Letters Patent is hereby corrected as shown below:

In the Claims:

Column 6, lines 13-63, delete:
"19. A method, comprising:
reflecting light received directly from a document with a first concave surface, wherein the first concave surface includes one or more short edges and one or more long edges, and wherein the one or more short edges curve to form the first concave surface;
reflecting light received from and reflected by the first concave surface with a second concave surface, wherein the second concave surface includes one or more short edges and one or more long edges, and wherein the one or more short edges curve to form the second concave surface; focusing the light received from and reflected by the second concave surface with a third concave surface, wherein the third concave surface includes one or more short edges and one or more long edges, and wherein the one or more long edges curve to form the third concave surface; and
sensing the light focused by the third concave surface.

20. The method of claim 19, wherein said sensing is performed at a focus of the light from the third concave surface.

21. The method of claim 19, wherein said sensing is performed by a charge couple device (CCD).

22. The method of claim 19, wherein said sensing is performed by a contact image sensor (CIS)."

Signed and Sealed this
Fourteenth Day of May, 2013

Teresa Stanek Rea
*Acting Director of the United States Patent and Trademark Office*

UNITED STATES PATENT AND TRADEMARK OFFICE

CERTIFICATE OF CORRECTION

PATENT NO. : RE41,634 E
APPLICATION NO. : 11/283480
DATED : September 7, 2010
INVENTOR(S) : Shih-Zheng Kuo It is certified that error appears in the above-identified patent and that said Letters Patent is hereby corrected as shown below:

Delete the title page and substitute therefore with the attached title page showing the corrected number of claims in patent.

In the Claims:

Column 6, lines 13-63, delete:
"19. A method, comprising:
reflecting light received directly from a document with a first concave surface, wherein the first concave surface includes one or more short edges and one or more long edges, and wherein the one or more short edges curve to form the first concave surface;
reflecting light received from and reflected by the first concave surface with a second concave surface, wherein the second concave surface includes one or more short edges and one or more long edges, and wherein the one or more short edges curve to form the second concave surface; focusing the light received from and reflected by the second concave surface with a third concave surface, wherein the third concave surface includes one or more short edges and one or more long edges, and wherein the one or more long edges curve to form the third concave surface; and
sensing the light focused by the third concave surface.

20. The method of claim 19, wherein said sensing is performed at a focus of the light from the third concave surface.

21. The method of claim 19, wherein said sensing is performed by a charge couple device (CCD).

22. The method of claim 19, wherein said sensing is performed by a contact image sensor (CIS)."

This certificate supersedes the Certificate of Correction issued May 14, 2013.

Signed and Sealed this
Eleventh Day of June, 2013

Teresa Stanek Rea
*Acting Director of the United States Patent and Trademark Office*

(19) United States
(12) Reissued Patent
Kuo

(10) Patent Number: US RE41,634 E
(45) Date of Reissued Patent: Sep. 7, 2010

(54) CONCAVE MIRROR OPTICAL SYSTEM FOR SCANNER

(76) Inventor: Shih-Zheng Kuo, No. 1., Alley 8, Lanes 57, Yusi Street, Yonghe City, Taipei County (TW)

(21) Appl. No.: 11/283,480

(22) Filed: Nov. 18, 2005

Related U.S. Patent Documents

Reissue of:
(64) Patent No.: 6,648,483
Issued: Nov. 18, 2003
Appl. No.: 09/611,755
Filed: Jul. 7, 2000

(51) Int. Cl.
*G02B 26/08* (2006.01)
*G02B 26/10* (2006.01)
*G02B 26/12* (2006.01)

(52) U.S. Cl. ..... 359/208.1; 359/857; 359/858; 359/859; 359/861

(58) Field of Classification Search ..... 359/208, 359/399, 857, 858, 859, 861, 365, 208.1
See application file for complete search history.

(56) References Cited

U.S. PATENT DOCUMENTS

| | | | | | |
|---|---|---|---|---|---|
| 4,210,707 | A | * | 12/1980 | Wetherell et al. | 359/859 |
| 4,357,075 | A | * | 11/1982 | Hunter | 359/858 |
| 4,572,659 | A | | 2/1986 | Omata | |
| 4,834,517 | A | * | 5/1989 | Cook | 359/366 |
| 5,071,240 | A | | 12/1991 | Ichihara et al. | |
| 5,815,310 | A | | 9/1998 | Williamson | |
| 5,999,311 | A | * | 12/1999 | Nanba et al. | 359/365 |
| 6,231,199 | B1 | | 5/2001 | Li | |
| 6,333,811 | B1 | * | 12/2001 | Iatian et al. | 359/366 |
| 6,426,506 | B1 | | 7/2002 | Hudyma | |
| 6,577,443 | B2 | | 6/2003 | Dinger et al. | |
| 6,850,361 | B1 | * | 2/2005 | Nakano et al. | 359/365 |

* cited by examiner

*Primary Examiner* – Alessandro Amari
(74) *Attorney, Agent, or Firm* – Stolowitz Ford Cowger LLP

(57) ABSTRACT

A concave mirror optical system for a scanner and a method for compensating image distortion. In this invention, the more expensive lens assembly in a conventional optical system is replaced by a concave mirror made from simple low-cost material so that production cost and chromatic dispersion are reduced. Moreover, different magnifications can be obtained due to a difference in focusing power of the concave mirror along XY axis direction.

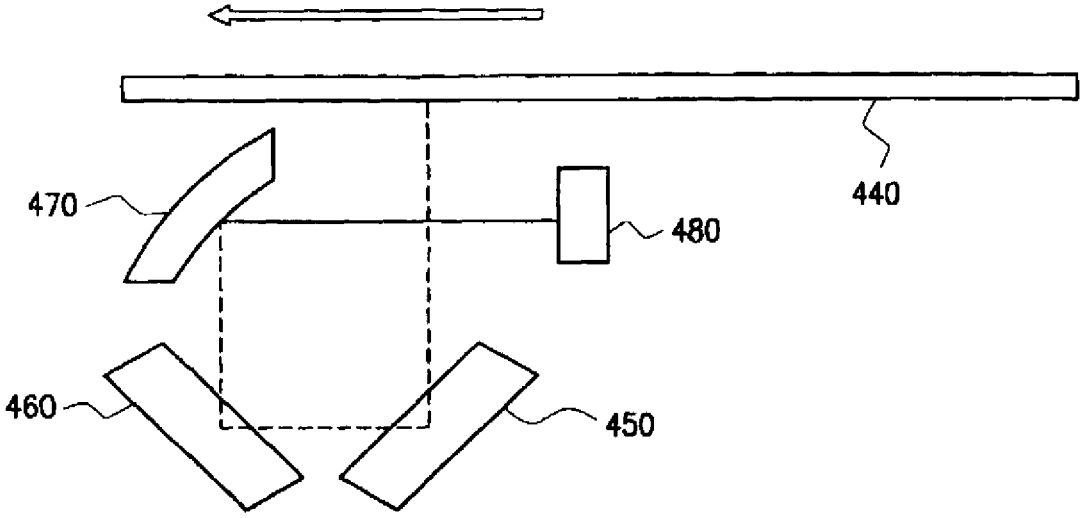

20 Claims, 6 Drawing Sheets